UNITED STATES PATENT OFFICE.

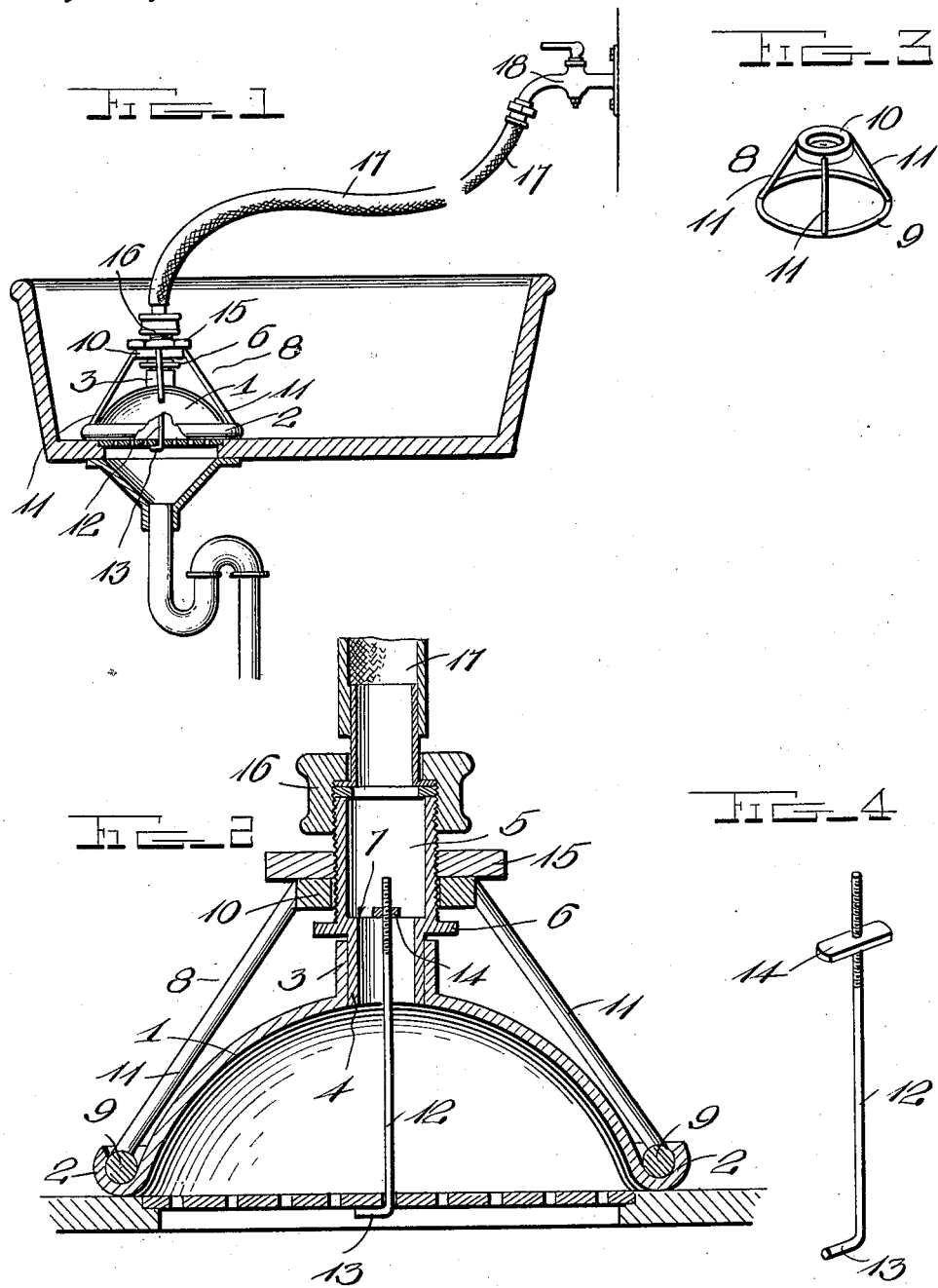

LEMUEL I. JONES, OF YOUNGSTOWN, OHIO, ASSIGNOR TO EXCELLO PRODUCTS COMPANY, OF DETROIT, MICHIGAN, A CORPORATION OF MICHIGAN.

FLUSHING DEVICE FOR WASTE-PIPES.

1,013,175.  Specification of Letters Patent.  Patented Jan. 2, 1912.

Application filed September 30, 1909, Serial No. 520,262. Renewed May 4, 1911. Serial No. 625,087.

*To all whom it may concern:*

Be it known that I, LEMUEL I. JONES, a citizen of the United States, residing at Youngstown, in the county of Mahoning and State of Ohio, have invented certain new and useful Improvements in Flushing Devices for Waste-Pipes; and I do declare the following to be a full, clear, and exact description of the invention, such as will enable others skilled in the art to which it appertains to make and use the same.

This invention relates to improvements in flushing devices for the waste pipes of sinks, wash bowls, closets and the like.

The object of the invention is to provide an improved flushing device of this character having means whereby the same may be readily connected with a faucet and means to tightly clamp the same over the drain opening of a sink, wash bowl or similar object whereby the whole force of the water from the faucet is directed into the drain or waste pipe, thus removing any obstructions therein and thoroughly flushing the same.

In the accompanying drawings, Figure 1 is a vertical sectional view of a sink showing the application of the invention thereto. Fig. 2 is an enlarged sectional view of the flushing device. Fig. 3 is a perspective view of the cup holding frame of the device. Fig. 4 is a perspective view of the clamping rod for tightly holding the device over the drain opening of the sink.

In the embodiment of the invention, I provide a cup which is preferably of hemispherical shape, and formed of flexible material preferably rubber and having on its lower edge an upwardly turned annular flange 2. In the upper side of the cup is formed a water inlet opening, which is surrounded by an upwardly projecting nipple 3. The nipple 3 is adapted to be engaged with the reduced lower end 4 of a hose pipe connection 5. The upper portion of the connection 5 is exteriorly threaded and between said upper portion and the reduced lower edge is formed a flanged edge 6. The reduced lower portion 4 of the connection provides an inner annular shoulder 7, the purpose of which will be hereinafter described.

Loosely engaged with the threaded upper portion of the connection is a cup holding frame 8 comprising a lower ring 9 and an upper smaller ring 10. The rings 9 and 10 are connected together by a series of inclined bars 11. When arranged in operative position the ring 9 of the frame is engaged with the upwardly turned annular flange 2 of the cup while the upper ring 10 is loosely engaged with the upper portion of the hose connection.

Arranged in the cup 1 is a centrally disposed clamping rod 12, the lower end of which is bent into the form of a hook 13, which is adapted to be hooked into the openings of the waste pipe strainer. The upper end of the rod 12 projects into the hose connection and extends above the shoulder 7. On the threaded upper end of the rod is secured a clamping plate or nut 14, which bears against the shoulder 7. On the threaded portion 5 of the connection above the ring 10 of the cup holding frame is secured a clamping nut 15. By screwing the nut 15 downwardly on the connection 5 the ring 9 of the frame 8 will be forced into tight engagement with the bottom of the sink or bowl, thereby forming a fluid tight connection between the lower edge of the cup and the bottom of the sink. When the nut 15 is screwed downwardly, the connection 5 is held by the clamping rod 12 thus permitting the frame 9 to be forced downwardly in the manner described.

With the upper end of the threaded portion 5 of the connection is engaged the coupling 16 of a flexible hose or tube 17, the opposite end of which is engaged with a faucet 18 whereby the entire force of the water passing through the faucet is conducted to the cup 1 and passes therethrough into the waste pipe of the sink or bowl to which the cup is applied. The couplings on the opposite ends of the hose may be of the usual or any suitable construction to facilitate quick and easy adjustment of the hose.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention:

1. In a flushing device for waste pipes, a flexible cup having an upwardly turned annular flange formed on its lower edge, a hose pipe coupling secured on the upper side of the cup, a cup holding frame arranged on said connection and engaged with the annular flange of the cup, a nut arranged on said hose connection to clamp the frame and cup in operative engagement with the waste pipe, a clamping rod adapted to be engaged with the strainer of the waste pipe, a clamping nut arranged on said rod and engaged with the hose connection, and a water conducting hose adapted to connect the cup with a faucet.

2. A flushing device for waste pipes comprising a flexible cup having at its lower edge a projecting marginal flange, a coupling for a water pipe connected with said cup, a movable cup-holding frame mounted on said coupling and engaging the marginal flange of said cup, an adjustable clamping rod adapted to connect said coupling with the strainer of a waste pipe, and means for actuating said frame to clamp the margin of said cup around the waste pipe opening.

3. A flushing device for waste pipes comprising a flexible cup, a coupling for a water pipe connected with said cup, a cup-holding frame movably mounted on said coupling and engaging the lower edge of said cup, means for detachably connecting said cup with a waste pipe, and means for actuating said frame to clamp the edge of said cup operatively around the waste pipe opening.

4. A flushing device for waste pipes comprising a flexible cup, a coupling for a water pipe connected with said cup, a holding frame movably mounted on said coupling and engaging the lower edge of said cup, means for detachably connecting said coupling with a waste pipe, and a nut threaded on said coupling and engaging said frame, whereby through a manipulation of said nut said frame may be actuated to clamp the edge of said cup operatively around the waste pipe opening.

In testimony whereof I have hereunto set my hand in presence of two subscribing witnesses.

LEMUEL I. JONES.

Witnesses:
H. R. GREENLEE,
MARY P. HENDERSON.

---

Copies of this patent may be obtained for five cents each, by addressing the "Commissioner of Patents, Washington, D. C."